Figure 1:
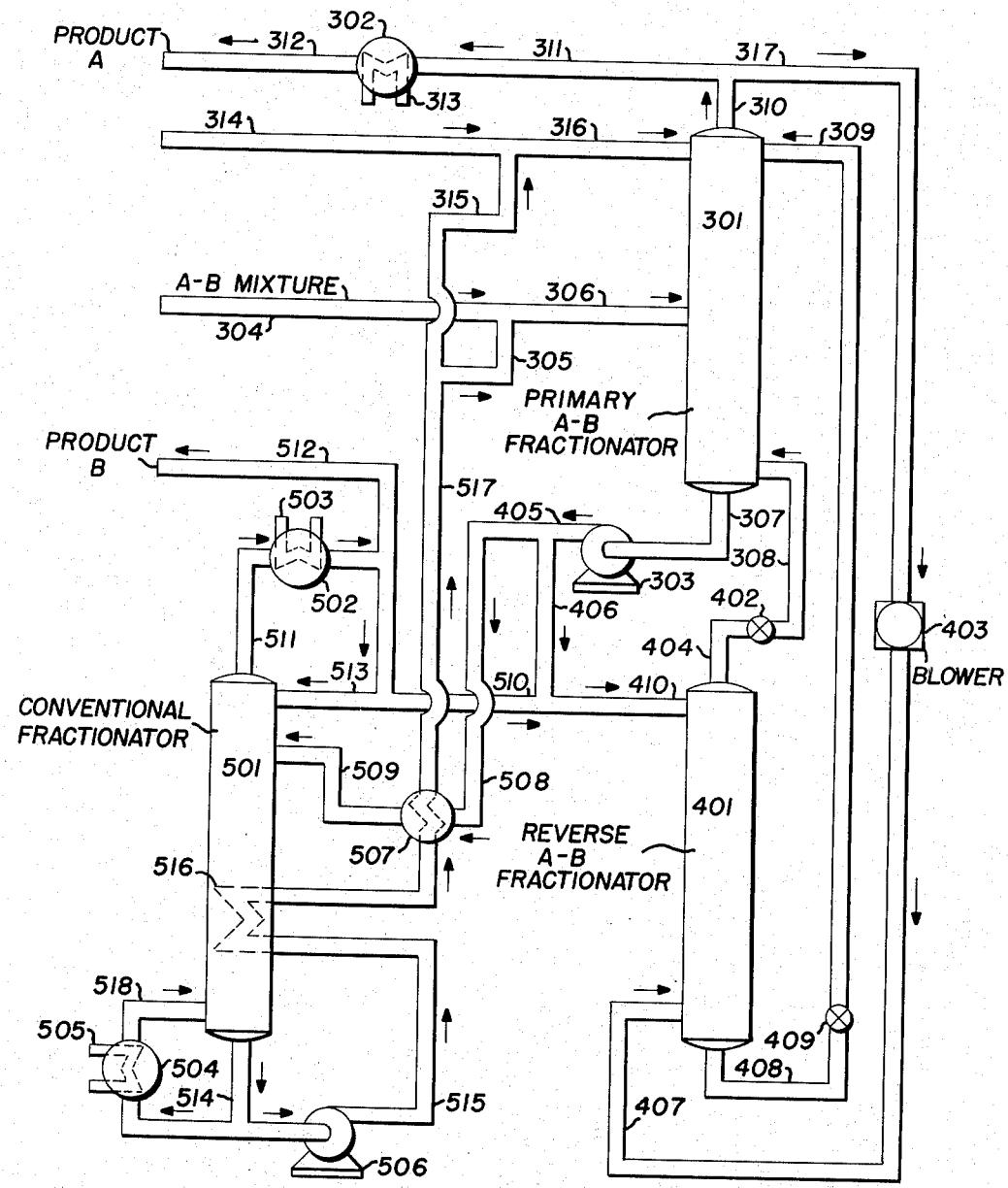

Isidor Kirshenbaum
Fredrick Lowell Jonach   Inventors
Lewis D. Etherington

Isidor Kirshenbaum
Fredrick Lowell Jonach  Inventors
Lewis D. Etherington

By *Richard H. Nagel* Attorney

United States Patent Office 2,901,404
Patented Aug. 25, 1959

2,901,404

PROCESS FOR THE SEPARATION OF FLUIDS BY EXTRACTIVE DISTILLATION

Isidor Kirshenbaum, Union, N.J., Fredrick Lowell Jonach, Kew Gardens, N.Y., and Lewis D. Etherington, Cranford, N.J., assignors to Esso Research and Engineering Company, a corporation of Delaware Application February 18, 1955, Serial No. 489,218

20 Claims. (Cl. 202—39.5)

This invention relates to the separation of fluid mixtures into their individual constituents, and more particularly to the separation of components utilizing a third component or combining agent which has a tendency to combine selectively with one of these constituents.

Reference is made to co-pending application entitled "Separation of Hydrocarbons," Serial No. 198,716, filed December 1, 1950, now U.S. Patent No. 2,702,826, of which that application is a continuation in part. In this patent a process is disclosed and claimed in which liquid or gaseous mixtures are separated into their components, utilizing an adsorption medium such as activated carbon, silica gel, or the like. In that process, components were separated whose relative volatility in the adsorbed phase was a function of a thermodynamic variable of the class temperature and pressure. Such a mixture was contacted at one temperature and pressure with a selective adsorbent in a first stage to form a first unadsorbed phase and a first adsorbent plus adsorbed phase. A portion of the first unadsorbed phase was removed as one product. In a second stage the first adsorbent plus adsorbed phase was contacted with a second portion of the first unadsorbed phase at a different temperature and/or pressure to give a second unadsorbed phase and a second adsorbent plus adsorbed phase. Because of the change of relative voltatility in the second stage, the first adsorbed phase was desorbed from the adsorbent and replaced by the second or recycle portion of the first unadsorbed phase. Thus, the two contacting zones, operating at conditions to give different relative volatilities, effect at least a partial separation of the original feed mixture. As pointed out in the aforesaid patent, savings on both desorption heat and cooling for removal of adsorbed heat may be realized over a conventional process making the same separation. In addition, the use of an extraneous desorption-stripping agent is avoided. It was also pointed out that it is at times convenient to use a mixed adsorbent in order to control the variation of relative adsorptivity with pressure, temperature or density.

The term "relative volatility of A to B" as used hereinafter in describing mixtures of components A and B is defined as the ratio of the mol fraction of component A in vapor phase at equilibrium divided by the mol fraction of component B in vapor phase under the same conditions to the mol fraction of A in liquid phase divided by the mol fraction of B in liquid phase.

It has now been found that similar changes in relative volatility of the components of fluid mixtures may be effected by varying the concentration of a third component or combining agent in the system. This combining component may be a mixed adsorbent, if an adsorption process is relied on to effect the separation, or it may be an extracting or azeotroping agent, which may be employed when the components of the fluid mixture are to be separated by extractive or azeotropic distillation. The concentration of the combining agent may be changed by the addition of more or another combining agent, or, in cases where a mixture of combining agents is initially employed, by changing the ratio of the combining agents to one another.

The problems existing in conventional extractive or azeotropic distillation are quite similar to those existing in adsorption processes, namely, a substantial volume of material must be handled in volatilizing the extracting or azeotroping agent, thus, requiring the use of considerable amounts of heat and the employment of equipment of very substantial size. Just as in the case of adsorption, an extraneous stripping agent must sometimes be employed to separate the extracting or azeotroping component from the extracted material. This expedient often requires additional separating steps and the employment of additional heat and equipment.

According to the present invention, a fluid mixture of components A and B, whose relative volatility is a function of the amount of a combining agent which has a tendency to combine selectively with one of the components of said mixture, is contacted in a primary fractionator with a predetermined amount of combining agent at a predetermined set of temperature and pressure conditions to form an uncombined phase enriched in component A and a combined phase containing combining agent and component B together with a reduced amount of component A. A portion of the uncombined phase is withdrawn from the first zone as a first product, and the remaining portion of the uncombined phase is contacted with at least a portion of the mixture of combining agent and material enriched in component B in a second or "reverse" fractionation zone. The concentration of combining agent in this reverse fractionation zone is different from that in the first zone so that the relative volatility of component A to component B is now less than it was in the first zone. Thus, the mixture enriched in component B is no longer an equilibrium mixture under conditions existing in the reverse fractionator so that A now displaces B from the combined phase to form a second uncombined phase enriched in component B. Additionally, a phase consisting of combining agent and material enriched in component A is formed. The material enriched in component A is withdrawn from the reverse fractionator and returned to the primary fractionator. At least a portion of the second uncombined phase enriched in B is also returned to the primary fractionator. In preferred embodiments, a portion of the combined phase from the primary fractionator may be passed to a separation zone for recovery of B and the combining agent.

According to the present invention, the combining agent referred to may be either a mixed adsorbent or an extraction or azeotroping agent. The preferred embodiment of the invention embraces its application to extractive distillation utilizing a relatively non-volatile combining or extraction agent. Numerous examples of extractive distillation are known to the art, and include the use of sulfuric acid as an extraction agent in separating nitric or hydrochloric acids from water. A similar process is employed in the separation of isopropanol from ethanol using water as an extractive agent and in separating normal heptane from methylcyclohexane using aniline as an extractive agent. In general, the function of this extractive agent is to selectively combine with one of the constituents to be recovered so that the other may be separated according to well-known distillation techniques. Thus, the extraction agent serves a purpose analogous to that served by the adsorbent in conventional adsorption processes. The process of the present invention is applicable to either of these processes, which may be regarded as special cases of the general method of separation employing a third component as a combining agent.

Figure 2:
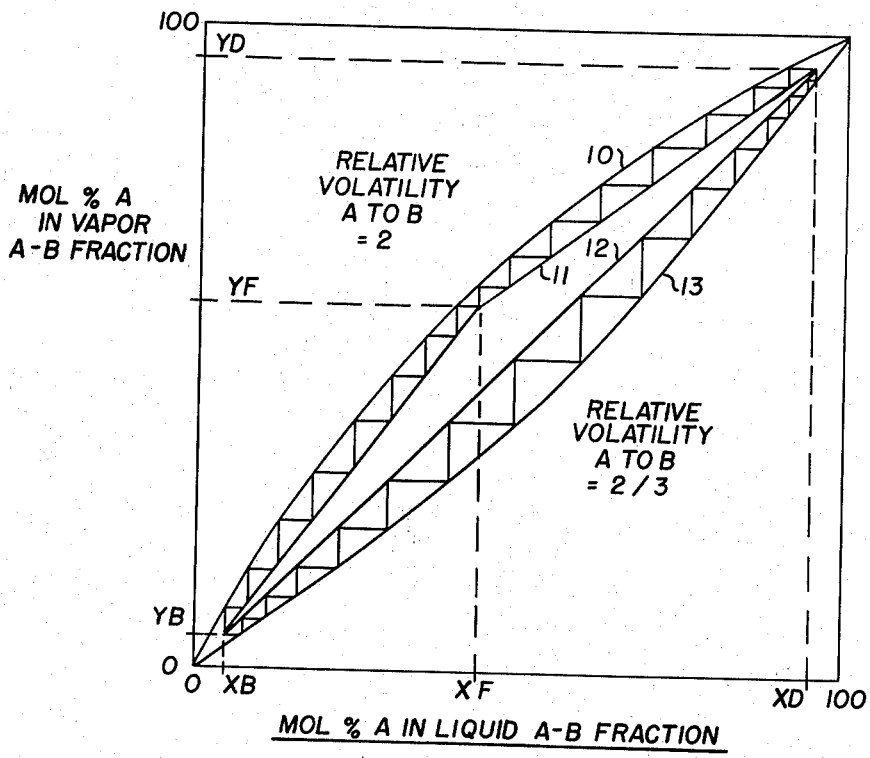

The process of the present invention may be better understood by reference to the accompanying drawings, in which:

Figure 1 is a diagrammatic representation of a flow plan showing an embodiment of the present invention as applied to extractive distillation; and Figure 2 is a conventional McCabe-Thiele diagram for components A and B separated according to the process illustrated by Figure 1.

The present invention will be illustrated specifically as applied to an extractive distillation process for separating two normally liquid components, which will be designated A and B, by means of a relatively non-volatile combining agent.

A mixture of components A and B is fed to the primary fractionation tower 301 via lines 304 and 306. A combining agent is introduced into the tower through lines 314 and 316 and is there mixed with the feed. The tower 301 contains conventional staging means such as bubble cap plates or packing. The relative volatility of A to B in tower 301 is 2, and is controlled by the concentration of the combining agent in the liquid phase.

Also introduced into the top of tower 301 is a liquid mixture, predominantly A and combining agent. This liquid flows downwardly through the various tower stages countercurrent to rising vapor. Component A being relatively volatile, concentrates toward the top of tower 301 and leaves as a vapor through line 310. A portion of this vapor is removed as product via lines 311 and 312 and may be condensed in heat exchanger 302 with refrigerant in coil 313. The remainder of component A is taken off in line 317. Component B concentrates with respect to A toward the bottom of tower 301 and is taken off as a liquid via line 307 and passed through pump 303 to line 405.

A portion of the liquid mixture in line 405, which is predominantly B and combining agent, is passed via lines 406 and 410 to the top of the "reverse" fractionation tower 401. The remainder passes to tower 501 via lines 508 and 509 for conventional separation of component B from the combining agent. A portion of the predominantly component B fraction thus separated in tower 501 is fed as liquid into the top of tower 401 via lines 510 and 410 along with the portion of the mixture of B and combining agent from the bottom of fractionator 301. Since some combining agent is being removed to fractionator 501, the resultant liquid mixtures at the top of and at other points in the tower 401 contain a smaller concentration of combining agent as compared to tower 301. The lower concentration of combining agent results in a relative volatility of A to B in tower 401 of 0.67.

The overhead vapor from tower 301 in line 317 (predominantly component A) is fed to the bottom of tower 401 via line 407 and the blower 403 if required. The reverse fractionator 401 is staged by conventional means such as bubble cap plates or packing in the same way as fractionator 301. In reverse fractionator 401 vapor flows upwardly countercurrent to the downflowing liquid. The vapor component A condenses and displaces from the equilibrium liquid the component B, which rises upward as vapor. Vapor, predominantly B, leaves the top of tower 401 via line 404, is throttled in valve 402 if required, and passes via line 308 to the bottom of tower 301. If desired, this vapor may in some cases be withdrawn as a product. A liquid product, predominantly A and combining agent, leaves the bottom of tower 401 via line 408, is throttled in valve 409 if required, and passes via line 309 as reflux to the top of fractionator 301.

The tower 501 is a conventional fractional distillation tower for separating B from the combining agent. Feed for this tower is provided by line 508 from the bottom of fractionator 301. A product, predominantly component B, is withdrawn from the top of this tower via lines 511 and 512. In effecting the separation between B and the combining agent, feed is introduced to a central portion of the fractionator tower 501, which is equipped with a condenser 502 (refrigerated via coil 503) and a reboiler 504 (heated by coil 505). The overhead vapor, predominantly B, leaving tower 501 through line 511 is condensed in the heat exchanger 502. A first portion of the condensate is removed through line 512 as product. A second portion is recycled via lines 510 and 410 to the top of tower 401 as previously mentioned. The remaining portion is refluxed to tower 501 via line 513. Product, predominantly combining agent, leaves the bottom of the tower 501 through line 514. A portion of these bottoms is reboiled in reboiler 504 and returned to the bottom of tower 501 through line 518. As an alternate to the reboiler, a stripping gas may be introduced to tower 501 through line 518. The remaining portion of the bottoms passes through pump 506 into connecting lines 515 and 517. One portion of the combining agent in line 517 is mixed with the original feed of A and B in tower 301 by means of line 305, and the remaining portion enters the top of the tower 301 through lines 315 and 316. Due to unavoidable losses of combining agent from the three-tower system, a make-up stream of this material in line 314 is added to the system. For better heat economy, hot combining agent in line 515 may be cooled by heat exchange with cooler fluid at one or more intermediate points in tower 501 (such as by coil 516) and may also be cooled by heat exchange with the cooler mixture in line 508 in heat exchanger 507.

Certain modifications to the process of Figure 1 may be desirable in accordance with well-known rules of heat balance and fractionator design which apply to conventional separation processes. For example, combining agent in lines 314 and 315 may join with the liquid stream to tower 301 in line 408. Furthermore, depending on such factors as the fluid condition in line 306 and the pressures of towers 301 and 401, it may be necessary to provide additional heating and cooling over and above that shown in Figure 1. For example, it may be desirable to cool the liquid entering tower 401 via line 406, or to vaporize a portion of the liquid in line 510. Cooling may be provided at any intermediate stage in tower 401 and above the feed point in tower 301. Heating may be provided at any intermediate stage of tower 401 and below the feed entry in tower 301. It may be desirable to combine towers 301 and 401 to save on structural supports. In this case, both tower sections could operate at substantially the same pressure or at substantially different pressures if separated by a blank plate and controlled at the appropriate temperatures dictated by vapor-liquid equilibrium relations. As a further example, liquid streams in lines 316 and 309 may be fed at intermediate stages between the top and feed entry points of tower 301, and a portion of the liquid in line 312 (predominantly component A) refluxed to the top of tower 301. This alternative would be desirable in cases where the combining agent was a liquid having significant volatility under the conditions existing at the top stage in tower 301. Another alternative is to withdraw a usually liquid side stream from tower 501 containing a lower concentration of combining agent than the liquid in line 406, and to introduce such a side stream into an upper portion of tower 401. A further alternative is to add at least a portion of the feed mixture in line 304 to tower 401 at an intermediate stage. By the same token, side streams may be removed from either tower 301 or tower 401 and removed as product or fed to the other of the two towers. Similarly, combining agent may be added to these towers at intermediate points. Improved heating and cooling economies may be effected by providing additional heat exchange such as between streams in lines 407 and 410 or 407 and 406.

Table I below sets forth a quantitative example of continuous separation of A—B mixture under the conditions of relative volatility previously set forth. The line numbers given in the left-hand column of the table refer to the reference characters of Figure 1.

*Table I*

| Line | Mols Per Hour of— | | | Mol Percent of— | |
|---|---|---|---|---|---|
| | A | B | Combining Agent | Total Liquid | Total Vapor |
| 306 | 50 | 50 | 200 | 83.3 | 16.7 |
| 315 and 316 | | | 408 | 100 | 0 |
| 309 and 408 | 129.2 | 6.8 | 136 | 100 | 0 |
| 310 | 176.7 | 9.3 | | 0 | 100 |
| 312 | 47.5 | 2.5 | | 100 | 0 |
| 317 and 407 | 129.2 | 6.8 | | 0 | 100 |
| 307 and 405 | 9.3 | 176.7 | 744 | 100 | 0 |
| 308 and 404 | 6.8 | 129.2 | | 0 | 100 |
| 510 | 5.1 | 96.9 | | 100 | 0 |
| 406 | 1.7 | 32.3 | 136 | 100 | 0 |
| 410 | 6.8 | 129.2 | 136 | 100 | 0 |
| 508 | 7.6 | 144.4 | 608 | 100 | 0 |
| 515 and 517 | | | 608 | 100 | 0 |
| 305 | | | 200 | 100 | 0 |
| 512 | 2.5 | 47.5 | | | |

The separation in fractionators 301 and 401 corresponding to the data given in Table I is represented graphically in Figure 2 by a conventional McCabe-Thiele diagram. Total vapor composition is plotted against liquid composition. The compositions are expressed on a combining-agent-free basis, even though the combining agent is present to some extent in all cases. This method of plotting is conventional for extractive distillation.

The two upper curves 10 and 11 represent the operation in tower 301. The two lower curves 12 and 13 represent conditions in reverse fractionator 401. Curves 10 and 13 represent equilibrium vapor-liquid composition relations, whereas curves 11 and 12 represent material balance relations. Curve 10 corresponds to a relative volatility A to B of 2.0 in tower 301 as controlled through the concentration of combining agent in the liquid phase. The bottom equilibrium curve 13 corresponds to a relative volatility A to B of ⅔ in reverse fractionator 401. According to the conventional McCabe-Thiele "Stair-Step" method as illustrated in Figure 2 (stepping between the equilibrium and material balance lines), about 16 theoretical equilibrium separation stages are required in primary fractionator 301 for the separation indicated. Similarly, on stepping between the two lower curves, about 14–15 theoretical stages are indicated in reverse fractionator 401. Compositions on the diagram are marked with letters to identify compositions on a combining-agent-free basis corresponding to Table I and Figure 1. Critical compositions are given as follows in Table II.

*Table II*

| Figure 2 Designation | Fluid | Mol Percent A in A-B Fraction | Stream Location on Figure 1 |
|---|---|---|---|
| XF | Liquid portion | 43 | line 306 (Feed). |
| YF | Vapor portion | 57 | Do. |
| XD | All liquid | 95 | lines 309 plus 316.[1] |
| YD | All vapor | 95 | line 310. |
| XB | All liquid | 5 | line 307. |
| YB | All vapor | 5 | line 308. |
| XB | All liquid | 5 | line 410. |
| YB | All vapor | 5 | line 404. |
| YD | do | 95 | line 407. |
| XD | All liquid | 95 | line 408. |
| XD | do | 95 | line 312 (A Product). |
| XB | do | 5 | line 512 (B Product). |

[1] Negligible A and B in line 316.

Under these conditions the liquid concentration of combining agent in tower 301 is maintained substantially constant at 80 mol percent, which facilitates control of the relative volatilities of A to B at the constant value of 2. Similarly, the liquid concentration of combining agent in reverse fractionator 401 is essentially constant at 50%, which facilitates control of relative volatility of A to B in this tower at ⅔.

In a conventional process for the separation of A and B under analogous conditions, using a single fractionator such as 301, the tower 401 would not be used, and the total stream in line 405 would go to tower 501. Thus, 136 mols per hour of A–B vapor would be returned via line 510 to the bottom of tower 301. The heat exchanger 302 would condense a total of 186 mols per hour of A–B and 136 mols per hour of this condensate would be refluxed to the top of tower 301. Thus, with ideal heat exchange and a substantially non-volatile combining agent, the minimum utility requirements for the conventional process would correspond to the vaporization of about 186 mols per hour of A–B mixture and the condensation of approximately 236 mols of such a mixture per hour. The corresponding requirements for the process of the present invention, as noted by inspection of Table I, are the vaporization of only 152 mols per hour and the condensation of only 202 mols per hour. The net utility saving on the present process carried out according to the arrangement shown in Figure 1 with ideal heat exchange would thus be 34 mols of condensation and 34 mols of vaporization per 100 total mols of A–B feed separated. Thus, the tower 501 and all of the attendant facilities of a conventional design except heat exchanger 502 would be 34/152×100, or about 22% larger than that required in the process of the present invention.

The example given above and illustrated in Figure 2 is based on a complete reversal of relative volatility of A to B between the primary fractionator 301 and the reverse fractionator 401. However, the process is operative to effect a separation of a fluid mixture into its components even when a complete reversal does not take place, as long as the relative volatility is changed. In other words, the relative volatility of A to B in tower 401 may be unity or greater than unity, but must be lower than the value prevailing in tower 301 at any given molal ratio of A to B encountered in a given phase in both of said towers. This does not preclude the encountering of an azeotroping effect in one or both towers, although such an effect will in some cases limit the sharpness of separation which can be realized in a given two-tower system.

Although the process of the present invention has been described with respect to an extractive distillation, it is equally applicable to an adsorption process employing a mixed solid adsorbent such as silica gel and activated carbon. In adsorption processes the principal advantages from the improvements of the present invention are the elimination of extraneous stripping agents such as steam and the elimination of the high temperatures ordinarily required in the desorption step in order to adequately regenerate the adsorbent, and attendant utility savings.

Table III set forth below lists volatility characteristics of particular three-component systems which may be employed in practicing the present invention with respect to extractive distillations.

*Table III*

| A-B Pair | Combining Agent | Liquid Conc. of Combining Agent, Mol Percent | Relative Volatility A to B |
|---|---|---|---|
| 1 {Isopropanol-Ethanol | Water | 99 | 1.8 |
| {Isopropanol-Ethanol | do | 80 | 1.4 |
| 2 {Normal propanol-Ethanol | do | 99 | 1.5 |
| {Normal propanol-Ethanol | do | 80 | 0.95 |
| 3 {Normal pentanol-Ethanol | do | 96 | 2.0 |
| {Normal pentanol-Ethanol | do | 80 | 0.7 |

Other examples of systems which exhibit relative volatility changes required for practicing the process of the present invention are as follows:

| A-B Pair | Combining Agent |
|---|---|
| Hydrochloric Acid-Water | Sulfuric Acid. |
| Nitric Acid-Water | Do. |
| Ethanol-Water | Glycerine. |
| Butene-Butane | Acetone or Furfural. |
| Butadiene-Butene | Do. |
| Isoprene-Pentene | Acetone. |
| Aromatics-Paraffins | Phenol. |
| Acetone-Methanol | Water. |

The process of the present invention is also applicable to the separation of iso-paraffins from normal paraffins, of olefins from paraffins, and to the separation of alcohols of different molecular weights from one another.

The present invention applies to any system in which a change in the relative volatility of A to B is effected by a change in concentration of a third extraneous component added to the A–B mixture. In order to obtain maximum advantages of the process, it is preferred that the volatility of the extraneous component be appreciably lower than that of either component A or component B. When the volatility of the third component is such that it appears predominantly in the primary fractionator overhead, as in the case of azeotropic distillations, it is difficult to realize maximum advantage from the present invention. However, azeotropic separations are within the purview thereof.

It will be understood that the combining agent can comprise a single extractive agent or a mixture of at least two such agents. When using a mixture of solid adsorbents, the two adsorbents may, for example, have different particle size ratios and the proportion of the two adsorbents can then be changed by complete or partial separation in cyclones.

Although the present invention has been described with respect to various specific applications thereof, it will be understood that it is not limited to such specific embodiments, but also covers such equivalents as will occur to those skilled in the art.

What is claimed is:

1. A process for separating a liquid mixture of components A and B where the relative volatility of A to B is responsive to changes in the concentration of a liquid combining agent in contact with said mixture, said combining agent being capable of selective combination with at least one of the components, comprising the steps of introducing said liquid mixture and said combining agent into the top of a first multi-stage fractionation zone, regulating the concentration of said combining agent in said first zone so that A is more volatile than B, fractionating said liquid mixture to produce a vapor enriched in A and a first liquid phase containing B and said combining agent, withdrawing a portion of said vapor enriched in A as a product, and introducing the remainder of said vapor into the bottom of a second multi-stage fractionating zone, introducing said first liquid phase into the top of said second zone, contacting downwardly flowing liquid with rising vapor to condense A vapor and strip B from said first liquid phase, thereby forming a vapor phase enriched in B and a second liquid phase containing A, B, and said combining agent, wherein the ratio of B to combining agent in said second liquid phase is less than in said first liquid phase, recycling at least a portion of said vapor phase enriched in B to the bottom of said first zone, recycling all of said second liquid phase to the top of said first zone and passing said second liquid phase downwardly through said first zone countercurrent to rising vapor enriched in B, whereby A is stripped from said second liquid phase, withdrawing liquid mixture of B and combining agent from the bottom of said first fractionation zone, and passing a portion thereof to a separation zone wherein B and combining agent are separated.

2. In an extractive distillation process for separating a liquid mixture of components A and B utilizing a relatively less volatile liquid extraction agent, the concentration of said agent in liquid A-B mixtures affecting the relative volatilities of A and B, the improvement comprising fractionally distilling said mixture of A and B in a first fractionating tower in the presence of a predetermined concentration of said extractive agent such that A is more volatile than B, withdrawing a vapor product consisting substantially of A from the top of said first tower, withdrawing a liquid bottoms product containing B and said extractive agent and passing a portion of said bottoms to the top of a second fractionating tower, introducing a portion of said vapor product from said first fractionating tower into the bottom of said second fractionating tower, controlling the concentration of said extractive agent in said second fractionating tower so that B is more volatile than A in said second tower, withdrawing a second liquid bottoms product containing principally A and extractive agent from said second tower and recycling all of said second bottoms product to the top of said first tower, withdrawing a second vapor product enriched in B from the top of said second tower and introducing said second vapor product into the bottom of said first tower and passing a portion of the liquid bottoms product of said first tower to a third fractionating tower, withdrawing a vapor product containing principally B as a product from the top of said third tower, withdrawing said extractive agent from the bottom of said third tower, and recycling said extractive agent to said first tower.

3. The process according to claim 2 wherein said extractive agent is a mixture of two liquids relatively less volatile than said components A and B and the ratio of said liquids to one another is different in each of said fractionating towers.

4. The process according to claim 2 wherein a portion of feed mixture of A and B is introduced into each of said fractionating zones at a plurality of intermediate points thereon.

5. The process according to claim 2 wherein a liquid side stream relatively poor in said extractive agent is withdrawn from an intermediate portion of said third fractionating tower and is introduced into an upper portion of said second fractionating tower.

6. The process according to claim 2 wherein A is isopropanol, B is ethanol, and said extractive agent is water.

7. The process according to claim 2 wherein A is normal propanol, B is ethanol, and said extractive agent is water.

8. The process according to claim 2 wherein A is normal pentanol, B is ethanol, and said extractive agent is water.

9. The process according to claim 2 wherein A is hydrochloric acid, B is water, and said extractive agent is sulfuric acid.

10. The process according to claim 2 wherein A is nitric acid, B is water, and said extractive agent is sulfuric acid.

11. The process according to claim 2 wherein A is ethanol, B is water, and said extractive agent is glycerine.

12. The process according to claim 2 wherein A is butene, B is butane, and said extractive agent is acetone.

13. The process according to claim 2 wherein A is butene, B is butane, and said extractive agent is furfural.

14. The process according to claim 2 wherein A is butadiene, B is butene, and said extractive agent is acetone.

15. The process according to claim 2 wherein A is butadiene, B is butene, and said extractive agent is furfural.

16. The process according to claim 2 wherein A is isoprene, B is pentene, and said extractive agent is acetone.

17. The process according to claim 2 wherein A is acetone, B is methanol, and said extractive agent is water.

18. The process according to claim 2 wherein one of said components is a normal paraffin and the other is an isoparaffin.

19. The process according to claim 2 wherein both of said components are alcohols.

20. The process according to claim 2 wherein one of said components is an olefin and the other is a paraffin.

References Cited in the file of this patent

UNITED STATES PATENTS

| | | |
|---|---|---|
| 2,588,272 | Morrell et al. | Mar. 4, 1952 |
| 2,591,714 | Morrell | Apr. 8, 1952 |
| 2,595,805 | Morrell et al. | May 6, 1952 |
| 2,612,467 | Morrell et al. | Sept. 30, 1952 |
| 2,620,294 | Carlson | Dec. 2, 1952 |
| 2,702,826 | Kirshenbaum et al. | Feb. 22, 1955 |